Dec. 22, 1931.     O. A. MILAM     1,837,369
MACHINE FOR HULLING NUTS AND THE LIKE
Filed Nov. 19, 1930
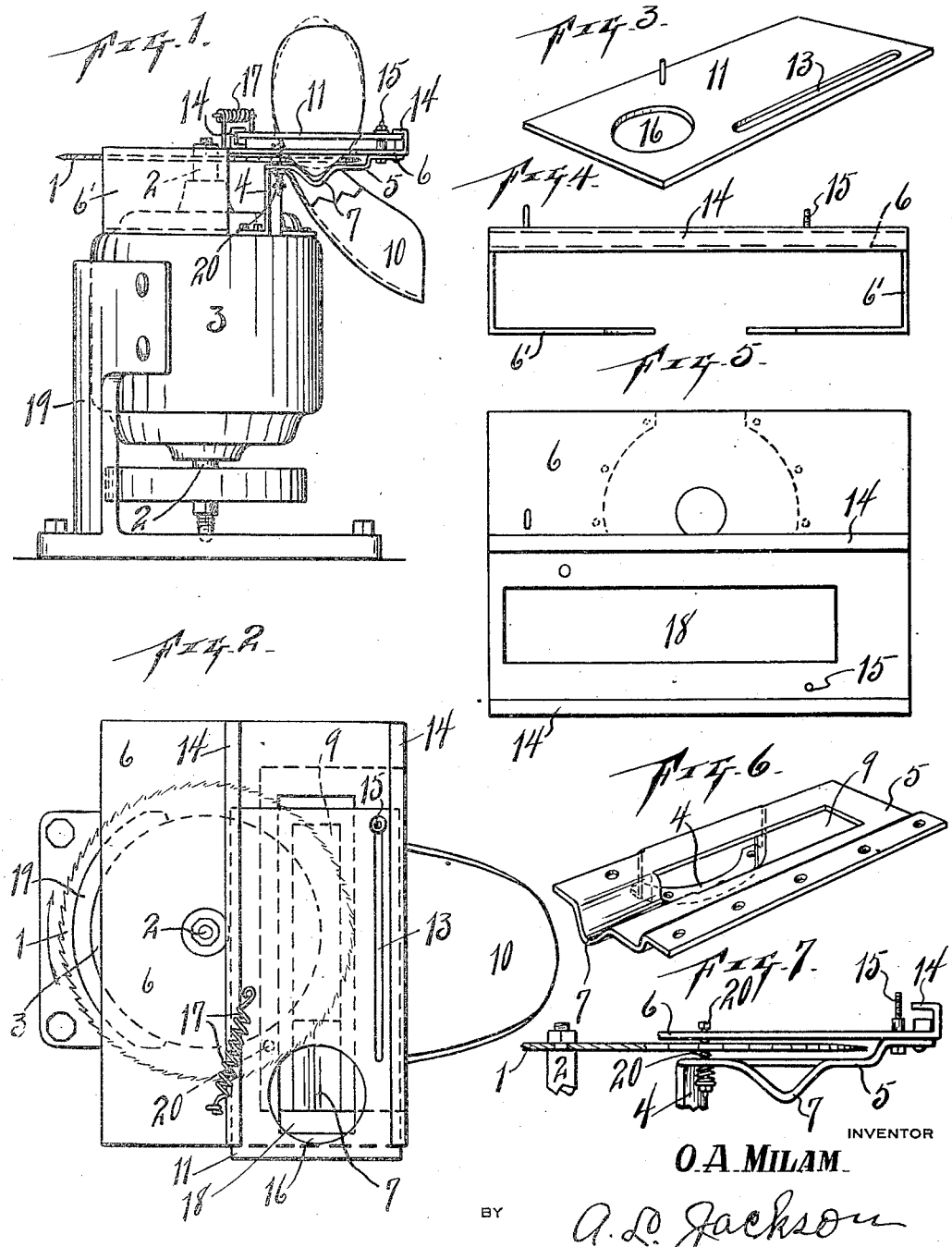
INVENTOR
O. A. MILAM
BY
ATTORNEY Patented Dec. 22, 1931

1,837,369

UNITED STATES PATENT OFFICE

ORAN AGUSTUS MILAM, OF BROWNWOOD, TEXAS, ASSIGNOR OF ONE-THIRD TO DOUGLAS COALSON AND ONE-THIRD TO ROBERT E. MILAM, BOTH OF BROWNWOOD, TEXAS

MACHINE FOR HULLING NUTS AND THE LIKE

Application filed November 19, 1930. Serial No. 496,747.

My invention relates to machines for hulling nuts and the like and more particularly for cutting the ends of the hulls off of the nuts; and the object is to provide simple mechanism for handling and cutting the shells preparatory to slitting the hulls longitudinally by the means shown in my companion application filled simultaneously with the present application. Other objects and advantages will be fully explained in the following description and the invention will be more particularly pointed out in the claims.

Reference is had to the accompanying drawings which form a part of this application.

Fig. 1 is an end elevation of the machine.

Fig. 2 is a plan view of the same.

Fig. 3 is a perspective view of the feeding plate.

Fig. 4 is a side elevation of one of the guide plates.

Fig. 5 is a plan view of the same.

Fig. 6 is a perspective view of the lower guide plate.

Fig. 7 is a broken sectional view of the saw and an end elevation of the guides therefor.

Similar characters of reference are used to indicate the same parts throughout the several views.

This machine is provided with a motor 3 which is provided with an upright shaft 2 and this shaft drives a saw 1 which is horizontally disposed. The motor 3 is provided with a bracket support 19. A bracket 4 is rigid with the motor housing and supports in part the lower guide plate 5. The motor 3 is supported by a frame 19. A guide plate 6 is supported on the motor housing by extensions 6' which are bent downwardly and then horizontally to engage the motor housing. A saw 1 is mounted on a vertical shaft 2 which is the motor shaft. A guide channel 14 is formed on one edge of the guide plate 6 and a guide channel 14 is attached to the other edge of the guide 6. These guides prevent displacement of the slide 11 in operation. The guide 6 has a slot 18 for receiving nuts which are to be sawed. A second guide plate 5 is attached to the guide plate 6 and to the bracket 4. The plate 5 has a groove 7 for movement of nuts and a slot 9 for discharging the nuts, or the sawed off ends. Nuts are inserted manually through the opening 16 in plate 11 and without removing the fingers from the nuts, the nuts are pushed with the fingers past the saw 1 which saws off the ends of the nuts. A spring 17 will bring the plate 11 back to starting position. The plate 11 has a slot 13 for the passage of the stub bolt 15 which also serves as a guide for the plate 11. The saw 1 is prevented from wabbling by gage bolts 20 which maintains the saw in the same horizontal plane. The necessity of two guide plates 5 and 6 exists by reason of the fact that the stem end of a nut is usually larger than the free end. For this reason the plate 5 is provided with a groove 7 which projects far enough under the saw for the saw to commence cutting the ends off of nuts. The large ends of the nuts will not go down into the groove 7, but will project far enough through the slot 18 to be caught by the saw and the ends cut off.

The nuts are fed to the machine singly by the hand by projecting the nut through the opening 16. The slide 11 aids in pressing the nut against the saw. When a sawing act is completed on one end, slide 11 comes back to starting point, the other end of the nut is projected through the opening 16 and the slide pushed forward to present the nut to the saw.

What I claim, is,—

1. A nut hulling machine comprising a frame, an upright shaft journaled in said frame, a saw rigid with said shaft, horizontal guides, one above and below said saw, each provided with a slot for receiving and guiding the end of a nut, and a slide operatively connected to the upper guide and provided with an opening to receive a nut.

2. A nut hulling machine comprising a frame, an upright shaft journaled in said frame, means for driving said shaft, a saw horizontally disposed and rigid with said shaft, a horizontal guide projecting partly under said saw and a horizontal guide projecting partly over said saw, gages carried by said guides for preventing said saw from wabbling, said lower guide having a groove and a slot for receiving the end of a nut while being sawed, said upper guide having a slot for the passage of a nut, an operating slide provided with an opening for the passage of nuts to said guides and for forcing nuts against said saw, and means for bringing said slide back to starting point.

3. A nut hulling machine comprising a frame, an upright shaft journaled in said frame, a saw rigid with said shaft and means for driving said shaft, guides rigid with said frame provided with means for holding nuts of different sizes, an operating slide mounted above said guides and provided with an opening for projecting nuts therethrough to said guides, means on said guides for guiding said slide in its reciprocal motion, and means for bringing said slide back to starting point automatically.

4. A nut hulling machine comprising a frame, a motor provided with a shaft journaled in said frame and provided with a housing, a saw rigid with said shaft, a lower guide rigid with said housing and provided with a groove and a slot for receiving nuts, an upper guide provided with a slot for the passage of nuts and attached to said frame and provided with guiding channels on the edges thereof, and a nut actuating slide adapted to move in said channels and provided with an opening to receive nuts to be forced past said saw.

In testimony whereof, I set my hand, this 10th day of November, 1930.

ORAN AGUSTUS MILAM.